US011726679B2

(12) United States Patent
Helmick et al.

(10) Patent No.: US 11,726,679 B2
(45) Date of Patent: Aug. 15, 2023

(54) APPLYING ENDURANCE GROUPS TO ZONED NAMESPACES

(71) Applicant: Western Digital Technologies, Inc., San Jose, CA (US)

(72) Inventors: Daniel L. Helmick, Broomfield, CO (US); Horst-Christoph Georg Hellwig, Austria (DE); Liam Parker, Edinburgh (GB); Ryan R. Jones, Mesa, AZ (US); Matias Bjorling, Copenhagen (DK)

(73) Assignee: Western Digital Technologies, Inc., San Jose, CA (US)

( * ) Notice: Subject to any disclaimer, the term of this patent is extended or adjusted under 35 U.S.C. 154(b) by 97 days.

(21) Appl. No.: 16/868,354

(22) Filed: May 6, 2020

(65) Prior Publication Data

US 2021/0132827 A1    May 6, 2021

Related U.S. Application Data

(60) Provisional application No. 62/930,897, filed on Nov. 5, 2019.

(51) Int. Cl.
*G06F 3/06* (2006.01)

(52) U.S. Cl.
CPC ............ *G06F 3/0629* (2013.01); *G06F 3/064* (2013.01); *G06F 3/0614* (2013.01);
(Continued)

(58) Field of Classification Search
None
See application file for complete search history.

(56) References Cited

U.S. PATENT DOCUMENTS 9,442,662 B2    9/2016 Dancho et al.
2018/0039417 A1*  2/2018 Kanno ............... G06F 3/0679
(Continued)

FOREIGN PATENT DOCUMENTS

JP    2017027387 A    2/2017
WO   2017/195928 A1   11/2017

OTHER PUBLICATIONS

Radian Memory Systems, "Symphonic Zones" Cooperative Flash Zones, http://www.radianmemory.com/wp-content/uploads/2019/02/Symphonic_Zones_Product_Overview_v1.pdf; 2019 (5 pages).
(Continued)

*Primary Examiner* — Charles Rones
*Assistant Examiner* — Jonah C Krieger
(74) *Attorney, Agent, or Firm* — Patterson + Sheridan, LLP; Steven H. VerSteeg

(57) ABSTRACT

EGs may be combined with ZNSs to offer greater control of how, where and under what configurations, data is stored to various user-defined sections on a SSD. In embodiments, this exposure of control functionalities to an SSD host provides improved performance to data center and other hyperscale users and their clients. In embodiments, larger SSDs may be partitioned into groups of zones for better usage by host devices. In embodiments, the groups may comprise, for example, EGs, sets and MUs, each containing a defined number of zones. In one or more embodiments, hosts may use different EGs to access the device and thereby manage die or channel conflicts in the SSD.

20 Claims, 12 Drawing Sheets

(52) U.S. Cl.
CPC .......... *G06F 3/0653* (2013.01); *G06F 3/0659* (2013.01); *G06F 3/0679* (2013.01)

(56) References Cited

U.S. PATENT DOCUMENTS

| | | | |
|---|---|---|---|
| 2018/0165016 A1* | 6/2018 | Malina | G06F 3/0652 |
| 2019/0073302 A1* | 3/2019 | Allison | G06F 12/0246 |
| 2019/0179570 A1* | 6/2019 | Bahirat | G06F 3/0659 |
| 2019/0220680 A1* | 7/2019 | Zhang | H01L 23/481 |
| 2020/0167274 A1* | 5/2020 | Bahirat | G06F 3/064 |

OTHER PUBLICATIONS

Wu, Chun-Feng et al.; "Improving Runtime Performance of Deduplication System with Host-Managed SMR Storage Drives", 55th ACM/ESDA/IEEE Design Automation Conference (DAC), Jun. 24, 2018 (6 pages).

* cited by examiner

APPLYING ENDURANCE GROUPS TO ZONED NAMESPACES

CROSS-REFERENCE TO RELATED APPLICATIONS

This application claims benefit of U.S. Provisional Patent Application Ser. No. 62/930,897, filed Nov. 5, 2019, which is herein incorporated by reference.

BACKGROUND OF THE DISCLOSURE

Field of the Disclosure

Embodiments of the present disclosure generally relate to non-volatile memory management and configuration, and more particularly to configuring a solid state device (SSD) by applying endurance groups with zoned namespaces (ZNSs).

Description of the Related Art

Non-volatile memory (NVM) Sets and Endurance Groups (EGs) are two recently developed organizational constructs for managing pools of storage that are larger than an individual Non-Volatile Memory Express (NVMe)[1] namespace. It is noted that an EG is a collection of NVM Sets, which consist of namespaces and unallocated storage. Each EG comprises a separate pool of storage for wear leveling purposes. They have their own dedicated pool of spare blocks, and, typically, a drive reports separate wear statistics for each EG. On drives with more than one EG, it is possible to completely wear out one EG and cause it to go read-only while other endurance groups remain usable.

[1] NVMe is a host controller interface and storage protocol created to accelerate the transfer of data between enterprise and client systems and solid-state drives (SSDs) over a computer's high-speed Peripheral Component Interconnect Express (PCIe) bus.

Thus, a drive can be designed to map specific NAND dies or channels to different NVM sets or endurance groups, essentially splitting it into multiple relatively independent drives. This can not only provide for separation of wearout, but also rigidly partitioning performance. For example, cloud hosting providers may put virtual machines from separate customers on different NVM sets or EGs to ensure that a busy workload from one customer does not affect the latency experienced by another customer. Thus, EGs and NVM Sets are commonly sought for use in datacenters and other hyperscale contexts. ZNSs, a technical proposal in the NVMe working group, is a new interface standard that allows zones of a SSD to be programmed sequentially.

Write amplification is an undesirable phenomenon associated with flash memory and solid-state drives (SSDs), where the actual amount of information physically-written to the storage media is a multiple of the logical amount intended to be written. Because flash memory must be erased before it can be rewritten, with much coarser granularity of the erase operation when compared to the write operation, the process to perform these operations results in moving (or rewriting) user data and metadata more than once. Thus, rewriting some data requires an already-used-portion of flash to be read, updated, and written to a new location, together with initially erasing the new location if it was previously used at some point in time. Due to the way flash works, much larger portions of flash must be erased and rewritten than are actually required by the amount of new data. This multiplying effect increases the number of writes required over the life of the SSD, which shortens the time it can operate reliably. The increased writes also consume bandwidth.

SUMMARY OF THE DISCLOSURE

In embodiments, EGs may be combined with ZNSs to offer greater control of how, where and under what configurations, data is stored to various user-defined sections on a SSD. In embodiments, this exposure of control functionalities to a SSD host (previously handled solely by a device controller) provides improved performance to data center and other hyperscale users and their clients. Thus, in embodiments, larger drives may be partitioned into groups of zones for better usage by host devices. In embodiments, the groups may comprise, for example, NVMe EGs and NVM Sets, each containing a defined set of zones. Additionally, in embodiments, hosts may use different EGs to access the device and thereby manage die or channel conflicts in the SSD.

In one embodiment, a method of configuring a solid state device (SSD), includes configuring at least a portion of the of the SSD as a zoned namespace, dividing the zoned namespace into one or more endurance groups (EGs), each EG including one or more sets, wherein each set has its own set of pre-defined attributes. Additionally, the method includes that each set of each EG includes one or more zones, and each zone includes one or more blocks.

In one embodiment, another portion of the SSD is configured as a conventional namespace.

In one embodiment, each set of each EG includes two or more zones.

In another embodiment, the method further includes providing a host interface configured to present configuration options of the zoned namespace to a user, receiving configuration commands from the user for the zoned namespace, and configuring the zoned namespace in accordance with the commands.

In another embodiment of the method, the host interface displays visual representations of dies of the SSD, and receives user input as to EG boundaries and set boundaries.

In another embodiment of the method, the user input includes lines drawn around or across the visual representations of the dies.

In another embodiment, a system includes a nonvolatile memory (NVM) device and a controller of the NVM device, the controller comprising a host interface, configured to receive configuration commands for the NVM device from a host computer, and processing circuitry, coupled to the host interface. The processing circuitry is configured to, in response to at least one command received from the host computer, configure a zoned namespace of the NVM to include one or more EGs. Each EG is to have its own set of attributes, and each EG includes one or more zones, where each zone includes one or more blocks.

In yet another embodiment, a computing apparatus includes means for receiving one or more user commands for configuring at least a portion of an SSD as a zoned namespace (ZNS), and means for configuring at least a portion of the of the SSD as a ZNS in response to the command. In the embodiment, the means for configuring includes means for dividing the zoned namespace into one or more endurance groups (EGs), each EG including one or more sets. In the embodiment, each set has its own set of pre-defined attributes, wherein each set of each EG includes one or more zones, and each zone includes one or more blocks.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1A:
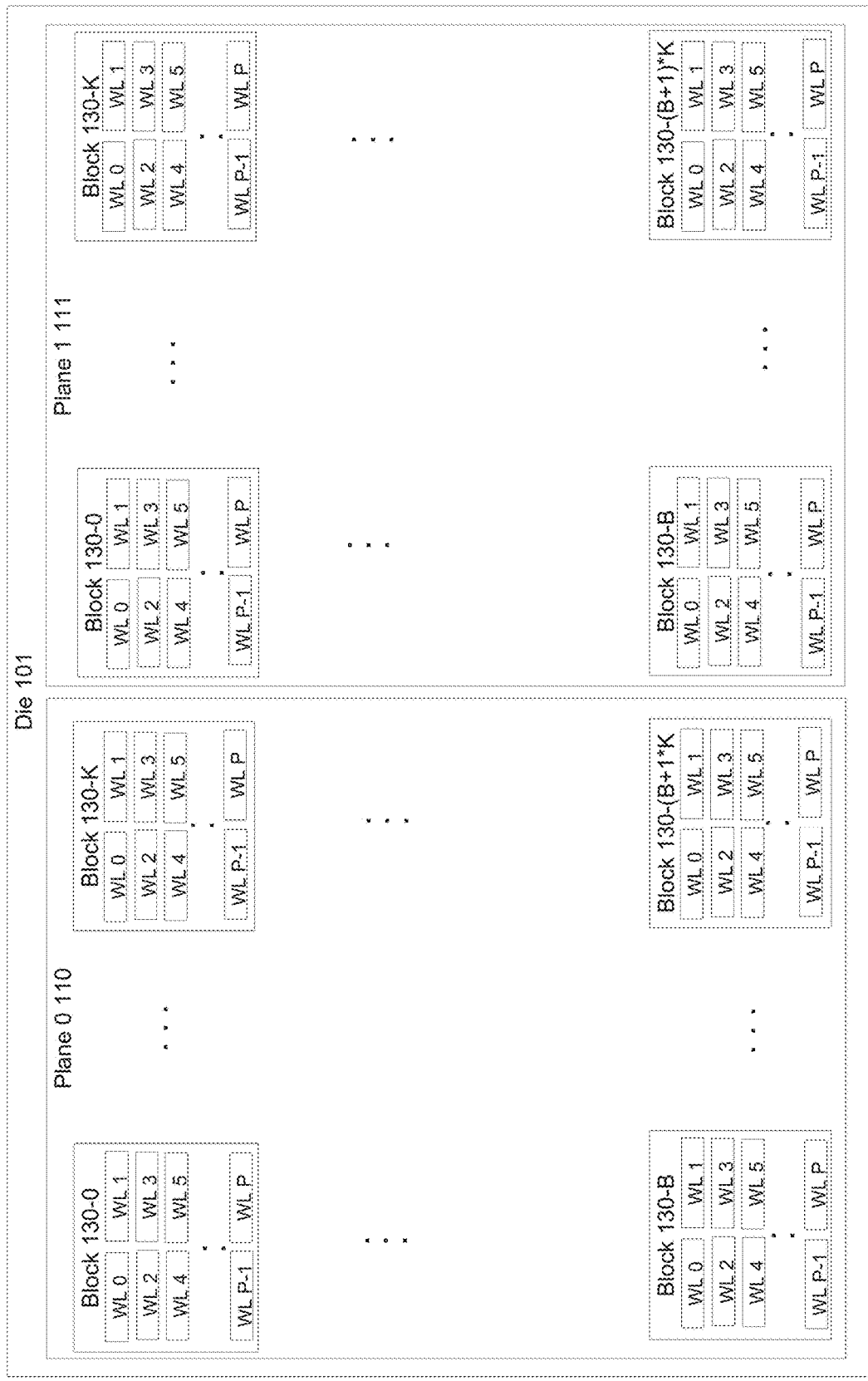
FIG. 1A illustrates an example NAND storage device, showing various groupings of memory elements on a die.

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure.

Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

As noted above, EGs and NVM Sets are commonly desired by hyperscale customers, such as, for example, data center operators. ZNS is a new interface standard that allows zones to be programmed sequentially. In embodiments, by combining EGs with ZNSs, a host may remove system write amplification because host file system write amplification and SSD garbage collection are performed together.

Various embodiments according to the present disclosure relate to storage devices in data centers. Each such storage device may function as a storage device for a host device, in accordance with such embodiments, and there may be an interface between the host device and the storage device. The interface may include one or both of a data bus for exchanging data with the host device as well as a control bus for exchanging commands with the host device. The interface may operate in accordance with any suitable protocol. For example, the interface may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like.

In embodiments, the storage device includes NVM which may include a plurality of memory devices. In some embodiments, each of the memory devices may be referred to as a die. In some examples, a single physical chip may include a plurality of dies (i.e., a plurality of memory devices). In some examples, each of the memory devices may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each media unit of the NVM may include any type of non-volatile memory devices, such as, for example, flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

As noted, in some embodiments, the NVM may comprise a plurality of flash memory devices. Flash memory devices may include NAND or NOR based flash memory devices, and may store data based on a charge contained in a floating gate of a transistor for each flash memory cell. In NAND flash memory devices, the flash memory device may be divided into a plurality of blocks which may divided into a plurality of pages. Each block of the plurality of blocks within a particular memory device may include a plurality of NAND cells. Rows of NAND cells may be electrically connected using a word line to define a page of a plurality of pages. Respective cells in each of the plurality of pages may be electrically connected to respective bit lines. Furthermore, NAND flash memory devices may be 2D or 3D devices, and may be single level cell (SLC), multi-level cell (MLC), which includes two levels, triple level cell (TLC), or quad level cell (QLC). Data may be written to and read from NAND flash memory devices at the page level and data may be erased from NAND flash memory devices at the block level.

By way of background, NAND flash memory is organized in a grid. The entire grid layout is referred to as a block, while the individual rows that make up the grid are called a page. Common page sizes are 2K, 4K, 8K, or 16K, with 128 to 256 pages per block. Thus, the block size of a typical NAND flash typically varies between 256 KB (page size of 2K and 128 pages per block) and 4 MB (page size of 16K and 256 pages per block). FIG. 1A illustrates an example NAND flash memory, showing the organizational hierarchy of elements. NAND flash memory cells are housed within NAND chips. The layout of a NAND chip, or a die, consists of four areas. These are, with reference to FIG. 1A, in descending order of size, a die 101, a plane 110, 111 a block 130 and wordline (WL) 140. FIG. 1A illustrates how these four areas are organized on an example NAND chip. With reference thereto, the largest element is die 101. Semiconductor wafers are cut from a block of electronic-grade silicon. The piece of wafer cut from the block is referred to as a die. A die contains from one to two planes. Within die 101 of FIG. 1A are shown two planes 110 and 111. Generally, planes can execute identical operations together. Planes contain varying numbers of blocks 130. Blocks are a useful designator because NAND flash cells can only be erased at the block level. R is for this reason that a block is sometimes known as a "minimum erase unit" or an "erase block unit."

In the example of FIG. 1A, in each plane 110 there are B rows of blocks, starting at a top row that begins with block 130-0, and ending at a bottom row that begins with block 130-B. Each row of blocks has K blocks in it, resulting in each plane having B rows and K columns. Thus, the first row ends with block 130-K, and the last row ends at block 130-(B+1). Thus, in this example, each of plane 0 110 and plane 1 111 have a total of (B+1)*K blocks. Additionally, in this example, each block 130 has P WLs as shown, beginning in the upper left of each block with WL 0, and ending in the bottom right of each block with WL P. As noted above, P may be, for example 128 or 256, or other higher multiple of two. Although this detail is not shown in FIG. 1A, each WL is composed of pages. In embodiments, memory cells may be single level cells (SLCs), where each cell stores on bit, or multi-level cells (MLCs), where each cell stores many bits. Thus, in such embodiments, while a SLC would have one page, an MLC would have two, an upper page (UP) and a lower page (LP). A TLC has three pages, adding a middle page (MP) to the LP and UP, and so on.

Figure 1B:
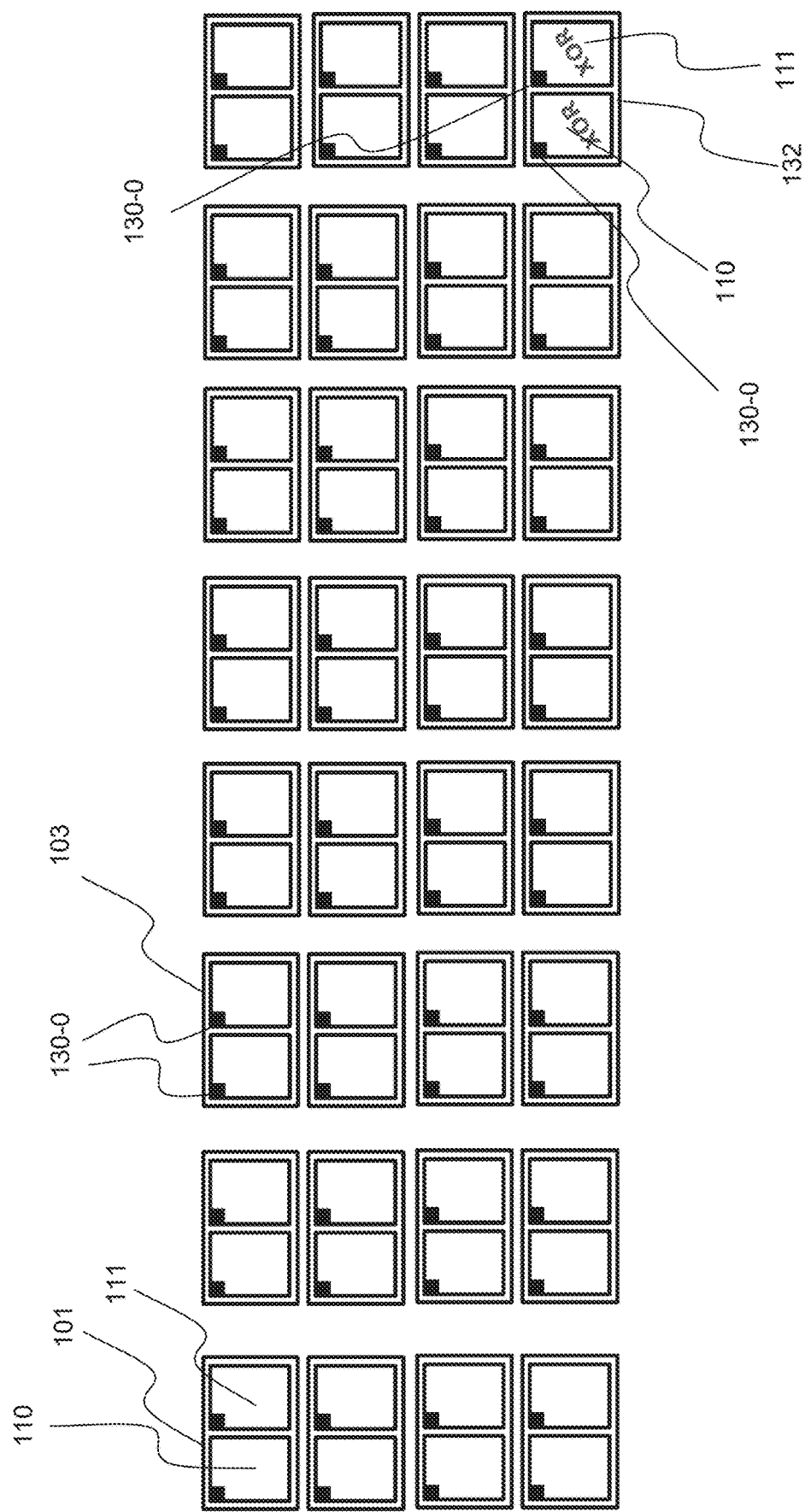
FIG. 1B illustrates an exemplary collection of dies in a grouping of NAND, in accordance with various embodiments.

FIG. 1B illustrates an exemplary collection of dies in a grouping of NAND, in accordance with various embodiments. With reference thereto, there are shown 32 dies 101 through 132, each of the type shown in FIG. 1A, for example. The 32 dies shown in FIG. 1B each have two planes 110 and 111, and, as described above, each plane includes several blocks 130. These blocks, for convenience, may be numbered as 130-0 through 130-N, where N is the total number of blocks per plane. Thus, N=(B+1)*K, using the numbering scheme shown in FIG. 1A. Moreover, the 32 dies 101 through 132 of FIG. 1B are mutually protected by using one of the dies, here die 132, to store, block by block, an XOR result of the other 31 dies. Thus, die 132 does not store any additional data, but rather metadata about the data stored in each of dies 101-131. In the depicted example, die 132 stores in the first block of its plane 110 the result of an XOR operation on all of the blocks 130-0 of the respective plane 110's of each of the other 31 dies. Further, it stores in the first block of its plane 111 the result of an XOR operation on all of the blocks 130-0 of the respective plane 111's of each of the other 31 dies. This is illustrated by the shaded block 130-0 shown in each upper left corner of each plane 110, 111 of each of the 32 dies in FIG. 1B (the shaded block 130-0 is labelled only in dies 103 and 132 so as not to overly complicate the figure). While the first block of each plane of each die in FIG. 1B is used as an illustration, an analogous XOR result is also stored in each plane of die 132 for each of the corresponding blocks 130-1 through 130-N. Thus, each plane of die 132 is used solely for storing XOR data of the corresponding plane of the other 31 dies, on a respective block by block basis.

As noted above, in the NVMe interface there are defined EGs as well as NVM Sets. Various embodiments in which zoned namespaces are combined with these structures are disclosed. It is noted, however, that alternate embodiments may combine ZNSs with other interfaces, in an analogous fashion. It is here noted that the term ZNS is provided for in the NVMe standard. However, other interfaces may also have different names for a functionally equivalent mechanism. For example, SAS and SCSI both have a similar feature developed for Shingled Magnetic Recording (SMR) HDDs called "zoned block command set", or "ZBC", and SATA uses a "zoned ATA command set" or "ZAC." It is further noted, though, that while neither SATA nor SAS provide for the EG or NVM Set concept of NVMe, these features could be added to any interface. Further it is also noted that related features such as LUNs could be extended to provide nominally replacement functionality. Thus, it is understood that EGs and NVM Sets from NVMe are understood to be one of many possible example embodiments of the systems and methods disclosed herein.

In embodiments, EGs may be applied to ZNSs to offer greater control of how, where and under what configurations data is stored to various user-defined sections on a SSD. In embodiments, this exposure of control functionalities to a SSD host (previously handled solely by a device controller) provides improved performance to data center and other hyperscale users and their clients. Thus, in embodiments, larger drives may be partitioned into groups of zones for better usage by host devices. In embodiments, the groups may comprise, for example, EGs and NVM Sets. Additionally, in embodiments, hosts may use different EGs to access the device and thereby manage die or channel conflicts in the SSD.

In embodiments, different descriptions of media endurance capabilities through the EGs are enabled. In addition, in embodiments, different zone sizes in different EGs, as well as different bits or cell usages in different EGs, are facilitated.

Figure 2A:
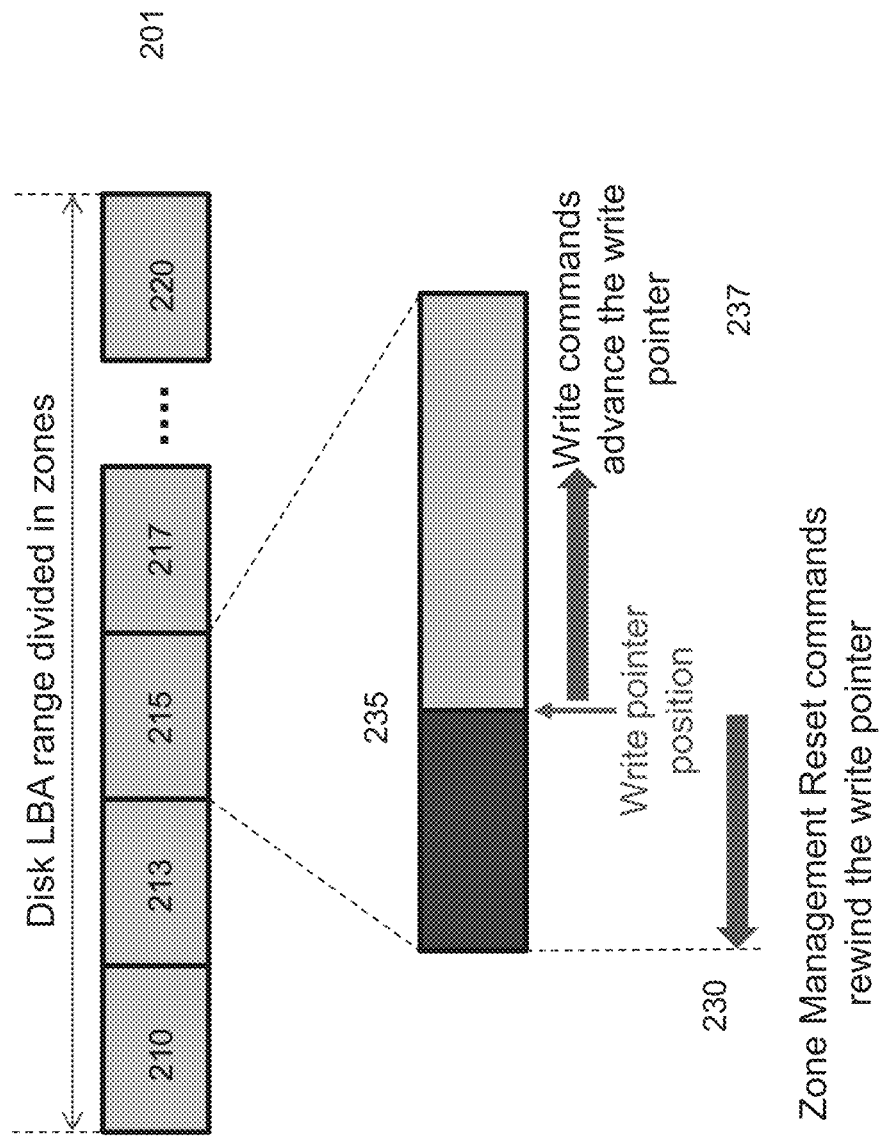
FIG. 2A illustrates division of a drive into zones, and various aspects of a sequential write zone, in accordance with various embodiments.

FIG. 2A illustrates division of a drive's logical block address space into zones 201, as well as detail for one of the example zones, in accordance with various embodiments. With reference to FIG. 2A, a logical block address (LBA) range 201 of an example disk is divided into various zones, including zones 210, 213, 215, 217, and on through a final zone 220. Each zone of zones 201 begins on a defined LBA, and each is assigned a range of LBA addresses. In embodiments, the zone sizes are not fixed, and may be chosen by a user. In some embodiments, the zone size is a multiple of a pre-defined number, such as, for example, the size of an erase block (sometimes referred to herein as simply a "block"). Thus, in such embodiments, the size of a zone, while variable, is always a multiple of the SSD's block size.

Figure 2B:
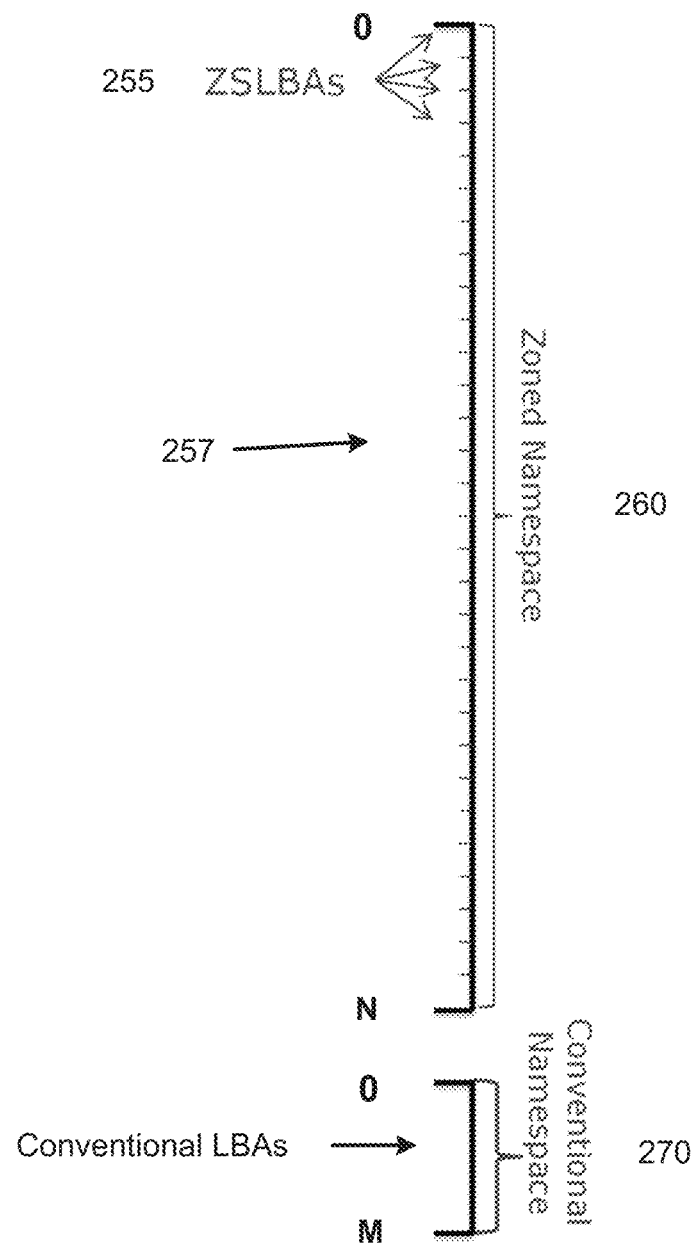
FIG. 2B illustrates a ZNS and an optional conventional namespace for an example drive, in accordance with various embodiments.

Continuing with reference to FIG. 2A, zone 215 is shown in detail at the bottom of the figure. It is noted that zones may be of two types, conventional and sequential write required. In a zone of the conventional type, data may be written to the zone either randomly, or sequentially. However, in a sequential write required zone, data may only be written to the zone sequentially. Thus, as shown in FIG. 2A, zone 215 is of the sequential write required type. Zone 215 has a beginning LBA shown at 230, and a final LBA shown at 237. At any given time there is a write pointer, shown here at write pointer position 235, and each additional write command that is executed advances the write pointer forward. Thus, in the example of FIG. 2A, the write pointer position advances to the right of the figure with each additional write command that is executed. Moreover, the zone must be entirely reset before being rewritten. In embodiments, this may be accomplished by a "zone management (ZM) reset" command followed by a ZM Open command, as shown at the bottom of FIG. 2A. Upon execution of the ZM Reset command followed by a ZM Open, the write pointer is moved to the first LBA of the zone. Thus, the zone may only be written to from the lowest Logical Block Address (LBA) or sector until the highest LBA, until filled, or, until fully reset, at which time the write pointer moves back to the beginning LBA 230 of the zone. FIG. 2B illustrates each of a ZNS 260 and an optional conventional namespace 270 for an example SSD, in accordance with various embodiments. Moreover, FIG. 2B illustrates how ZNS drives normally appear at the interface level, as seen, for example, by a user of a host computer to which the SSD is coupled. With reference thereto, there is shown zoned namespace 260, which spans LBAs 0 through N, as shown. In embodiments, each zone is identified by a starting LBA, known as a zone start LBA (ZSLBA). The ZSLBAs in FIG. 2B are represented by the horizontal lines 257 evenly spaced along the ZNS 260. Continuing with reference to FIG. 2B, there is also shown an arrow pointing at each of the first four ZSLBAs 255. As noted above with reference to FIG. 2A, sequential writes are required to each zone in the zoned namespace. This forces a drive to track a zone append point (equivalent to the write pointer position 235 of FIG. 2A) for each zone, and thereby enables a new command known as "Zone_Append" that may be used by distributed multi-threaded hosts.

It is noted that reads to all LBAs are always valid, and if a LBA is deallocated, a read to it returns a default trim value. In embodiments, a zone has attributes, such as, for example, a size, an optimal write size, and a minimum write size. In embodiments, as noted above, the zone size is variable, and may be set by a user, subject to certain parameters. This is described in greater detail below, with reference to FIGS. 4B through 4C.

Finally, with reference to FIG. 2B, conventional namespace 270 is not constrained to any zone attribute, and thus may be randomly written to. Additionally, conventional namespace 270 may contain data of various bits and cell usages, unlike a given zone of the ZNS 260, as described in detail below.

Figure 3A:
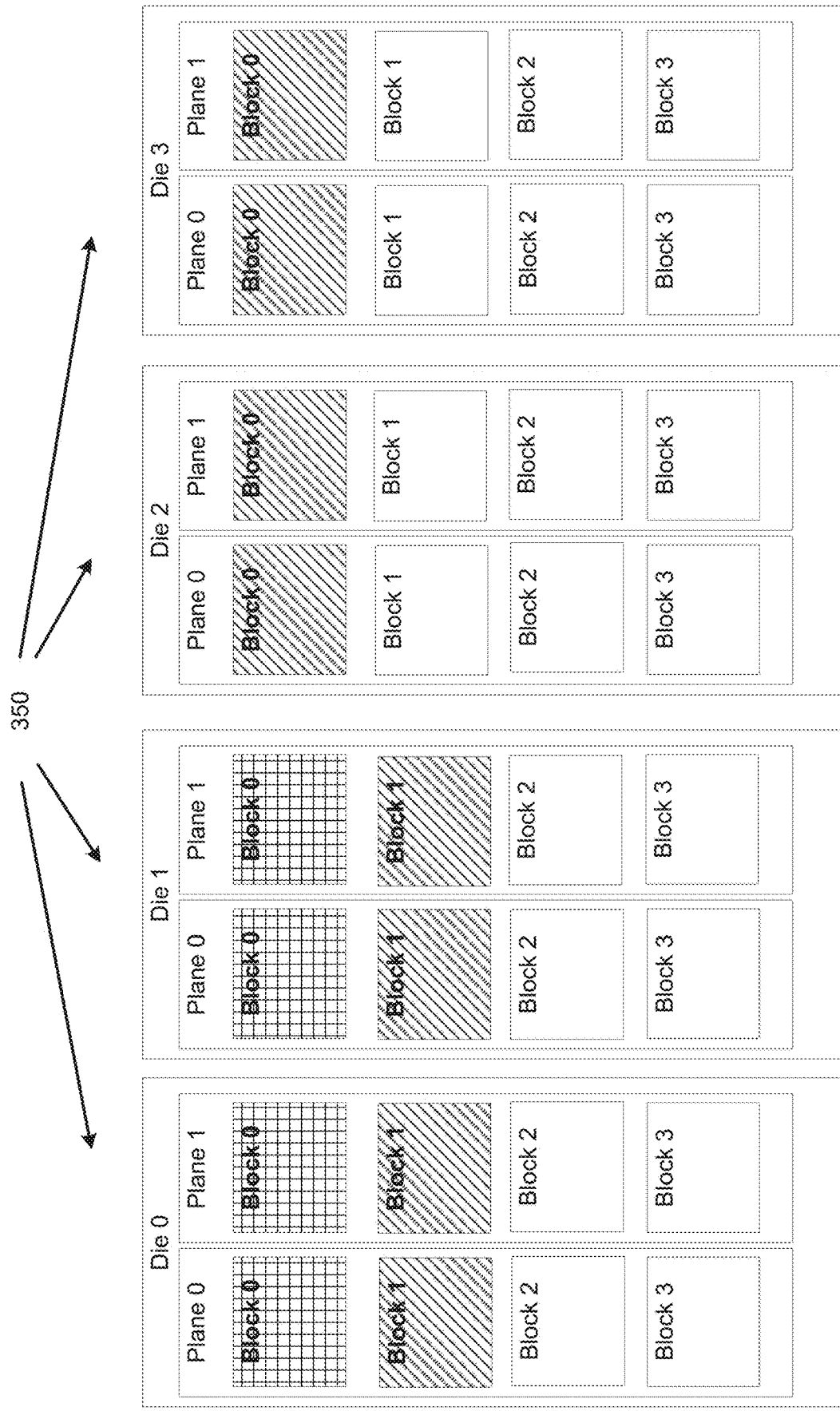
FIG. 3A illustrates an interface view of an example use case where two data flows are mapped to various dies of a SSD.
Figure 6:
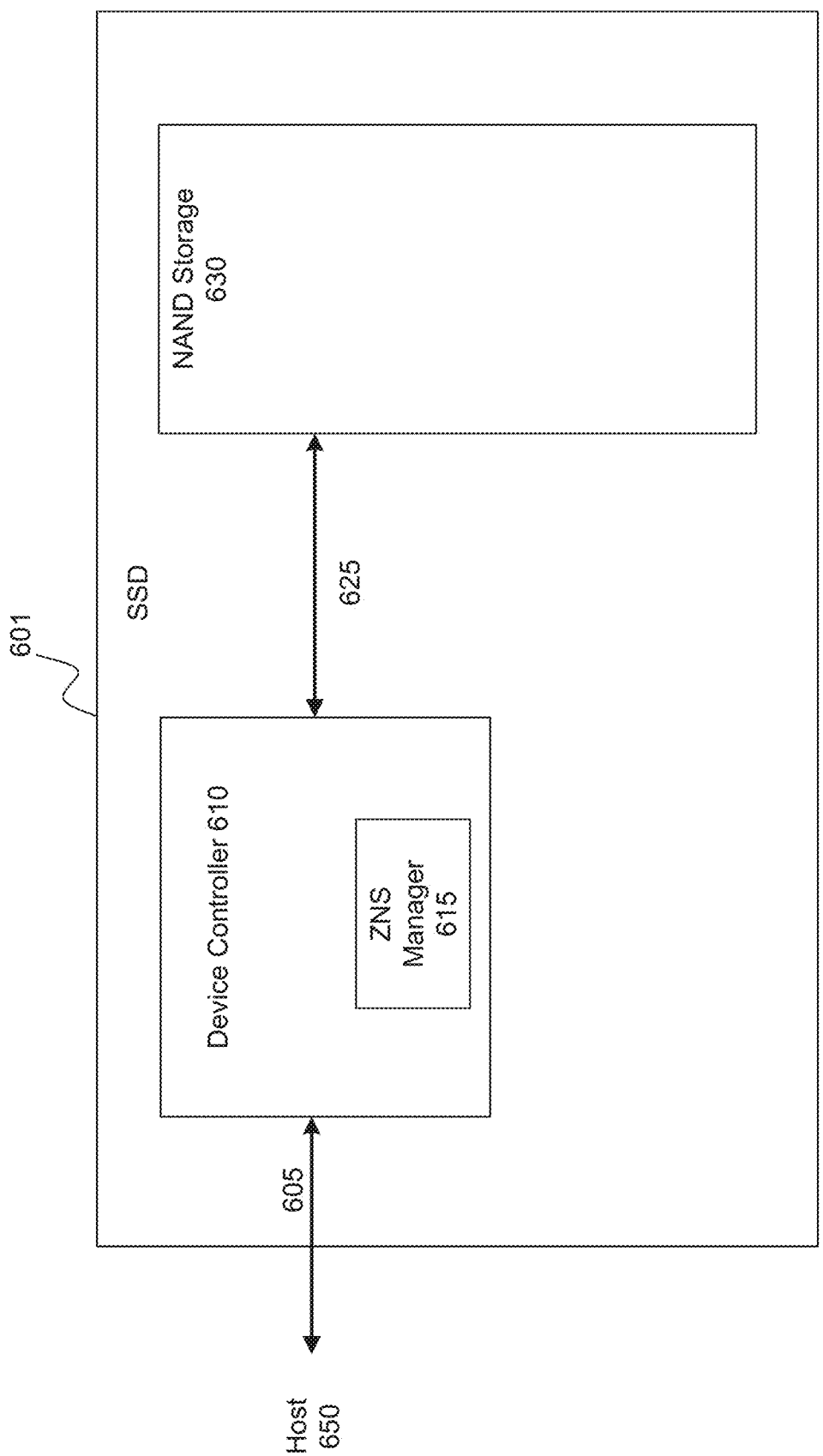
FIG. 6 illustrates an example NAND controller provided in a SSD, in accordance with various embodiments.

FIG. 3A illustrates an interface view of an example user configuration interface displayed on a host, such as, for example, host 650 of FIG. 6. The example interface view corresponds to an example use case where two data flows are mapped to various dies of an SSD. As used herein, a data flow is a set of data that is interconnected or related. For example, the data in a data flow may be related to some specific application or use. For example, to support a fleet of computer assisted or autonomous driving (CA/AD) vehicles, there may be several edge devices collecting traffic data of all types and sending it to data centers for processing. Each edge device may be located in a different location of a pre-defined region, and may collect data on an ongoing basis specific to a given roadway, intersection, neighborhood or locale, for example. The data collected from each device may be used to train pattern recognition or decision making modules, e.g., artificial neural networks (ANNs), which are collectively used in decision making for the vehicle. In such cases, it is often useful to initially segregate the data that is received from each edge device, process it with locale specific algorithms, and then subsequently use larger portions of the data, from several edge devices, in region-wide, or even system-wide algorithms. As a result, it is useful for users to tweak their various processing algorithms to pull the data to be input to those algorithms, from known specific places in memory.

Moreover, as another example, some of the data that is collected and used by an enterprise may become obsolete much more quickly than other data. For example, in the above-described CA/AD example, each edge device may have a given frequency at which it obtains new data, where the new data replaces an earlier set of data. Or, for example, in very high data applications, the raw data that is collected may have numerous errors in it, and it changes significantly after error correction coding is applied to it. As a result, the "revised" data is the data used for subsequent processing. The obsolescence of data may be used, in embodiments, to collect data of the same estimated obsolescence in the same memory blocks, to facilitate write amplification reduction and erasing of those blocks, once all, or most of, their data becomes obsolete.

To facilitate such user optimization of data storage, in embodiments, a user may be given access to certain aspects of NVM organization which allows the user to control which of its data is stored in which portion of the NVM, thereby allowing it to segregate common data, with common attributes that are fed into data specific algorithms. Moreover, in embodiments, the user is given control of the boundaries of such portions of the NVM, and may change these boundaries as desired, including on the fly. This allows the user to switch from processing the data, for example, using locale specific models and algorithms, to more general, regional or even system wide, algorithms and models. This is illustrated in FIGS. 3A and 3B, for example.

Thus, the view of FIG. 3A is that seen from an example user interface that is configured to allow the user, operating a host computer, to designate various data flows and their properties. With reference thereto, there are shown schematic views of four dies 350 of an example SSD that a user is configuring through the example interface. These include die0 through die3. There are also shown two data flows, being DataFlow1 301 and DataFlow2 302. These are indicated in FIG. 3A by different shadings of the blocks respectively assigned to them, as shown. As noted above, the data flows involve a process by which portions of data stored on an SSD may be grouped together in a defined group comprising one or more blocks based, for example, on an estimated deletion time of all of the data in the group. By storing data that is likely to be deleted together in the same erase block or group of erase blocks (i.e., the same data flow), a number of the problems associated with SSD storage may be alleviated. Thus, a data flow may include several blocks across several dies.

Continuing with reference to FIG. 3A, each of the four depicted dies, Die 0, Die 1, Die 2 and Die 3 has two planes, Plane 0 and Plane 1, as shown. In embodiments, the data flows are mapped to various blocks of various dies, each block comprising two portions, one in each plane of each of the dies. Thus, DataFlow1 301 comprises two blocks from each of die0 and die1, in the top row of each of die0 and die1, respectively, and Data Flow2 305 comprises four blocks, two shown at the top row of each of die2 and die3, respectively, and two shown in the second row of each of die0 and die1, respectively. Moreover, it is noted, within each data flow, it is also possible to further group data into sub-flows, where each sub-flow is assigned to a specific page or pages within a block. In embodiments, the two data flows may be respectively mapped to zones.

Figure 3B:
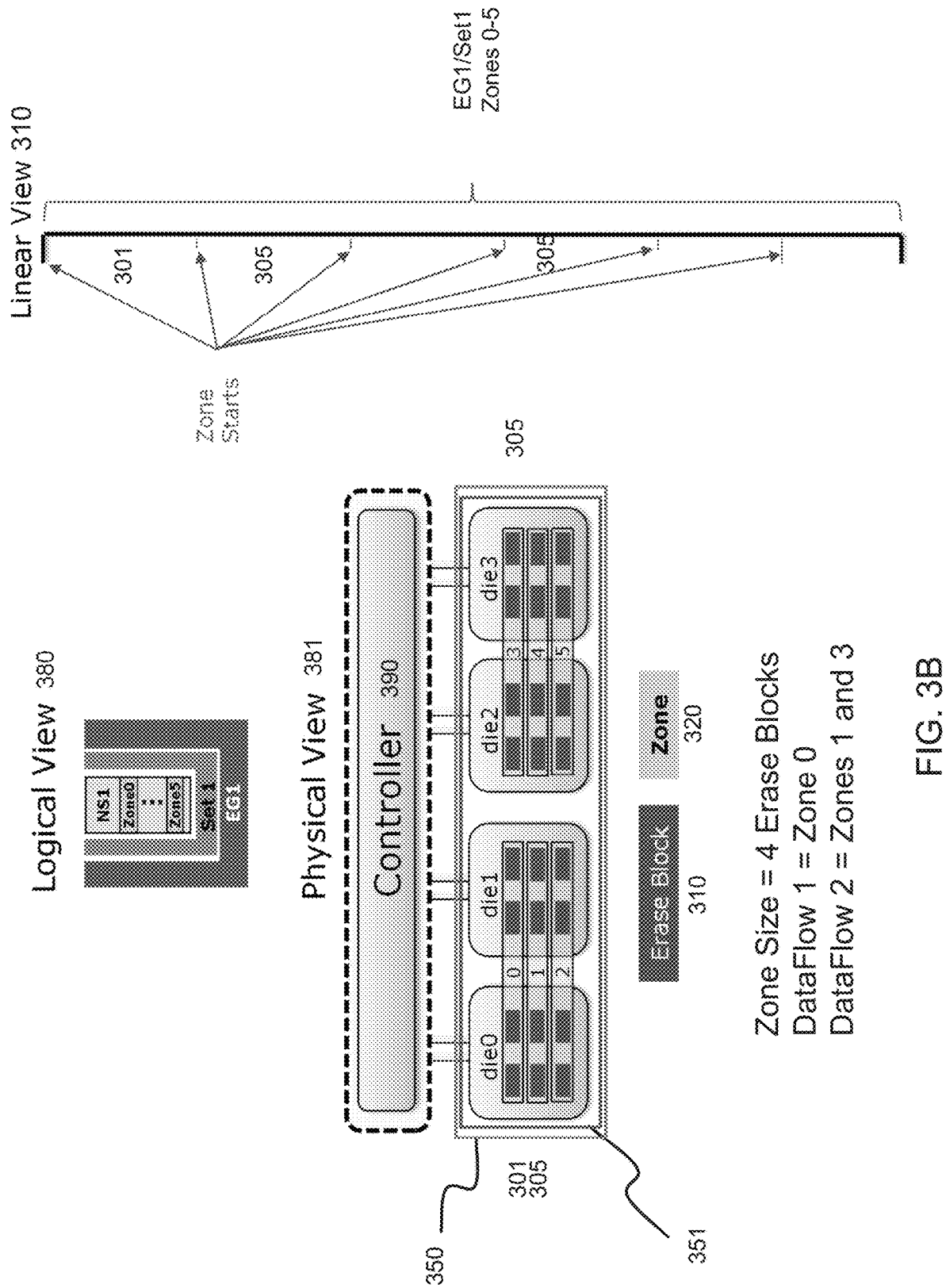
FIG. 3B illustrates a physical view of the example use case of FIG. 3A mapped onto three zones of a SSD, in accordance with various embodiments.

FIG. 3B illustrates the example data flows of FIG. 3A mapped onto an example LBA space with marked Zone Start LBAs (ZSLBAs) of an example SSD, in accordance with various embodiments. The two exemplary data flows shown in FIG. 3A are thus mapped onto four zones of the example SSD. As shown at the bottom of FIG. 3B, in physical view 381, DataFlow1 of FIG. 3A is mapped to Zone0 of FIG. 3B, and DataFlow2 of FIG. 3A is mapped to Zone1 and Zone3, respectively of FIG. 3B. These mappings of the two data flows to zones of the four dies thus mirror the user entered assignments of the two data flows to the dies, as shown in FIG. 3A. In FIG. 3A, DataFlow1 was assigned to the first row of each of dies die0 and die1. Thus, as shown in FIG. 3B, Data Flow1 is mapped to Zone0, which occupies the first row of each of die0 and die1. Additionally, DataFlow2 was assigned in FIG. 3A to the first row of each of dies die2 and die3, and to the second row of each of dies die0 and die1. Thus, as shown in FIG. 3B, DataFlow2 is mapped to Zones 1 and 3. Zone3 occupies the first row of each of die2 and die3, and Zone1 occupies the second row of each of die0 and die1.

Continuing with reference to FIG. 3B, at the top center of the figure there is also shown a logical view 380 of the SSD, and at the far right of FIG. 3B there is shown a linear view 310 of EG1, its single set Set1, and its six zones, being Zone0 through Zone5.

Continuing with reference to logical view 380 of FIG. 3B, this view depicts the six zones of an EG of the SSD, EG1. EG1 maps to the same four dies shown in the interface view of FIG. 3A, namely die0, die1, die2 and die3. These six zones are all contained in the sole NVM set of EG1, here called Set1, as shown. In this regard it is noted that, in embodiments, an EG may have a plurality of sets. Each set may comprise a plurality of zones, as described more fully below. As described above, in embodiments, the data flows of FIG. 3A may each be mapped to one or more zones within the EG of FIG. 3B. Thus, logical view 380 presents the organizational hierarchy, in accordance with various embodiments, at a glance. At the highest level are EGs. Each EG may have a plurality of NVM sets, although in general it is most common for an EG to have a single set. Within each set there may be a plurality of zones. Thus, in this example there are six zones, being zone0 through zones. Each zone includes multiple blocks, or, as referred to in FIG. 3B, "erase blocks" 310. In the depicted example, each zone includes four erase blocks, two per die.

Continuing with reference to FIG. 3B, physical view 381 depicts an SSD controller 390 and the four dies included in EG1. There are, as shown, two boundaries drawn around these four dies, an inner boundary 351, and an outer boundary 350. In embodiments, the inner boundary refers to a set, and the outer boundary refers to an EG to which the set belongs. Here, the EG contains only one NVM set, which, as noted above, is the most common case. However, in the general case, in embodiments, there may be several inner boundaries 351 within a single outer boundary 350, representing the fact that there may be several sets within each EG.

Continuing with reference to FIG. 3B, as noted above, each zone includes four blocks. This is reflected in the color key shown at the bottom of FIG. 3B, where a zone is shown as a yellow, or lightly shaded box 320, whereas its component erase blocks are shown in blue, or darkly shaded boxes 310. Thus, in physical view 381, as a matter of visual presentation, a yellow box (zone) will contain several blue boxes (erase blocks). This is the case with each of the six zones shown in FIG. 3B.

Finally, as noted above, in FIG. 3B, DataFlow2 is mapped to both Zone1 and Zone3. Zone3 occupies the first row of each of die2 and die3, and Zone1 occupies the second row of each of die0 and die1, as shown. The sole zone of DataFlow1 is thus labelled as "301", tracking the label of DataFlow1 in FIG. 3A, and the two zones of DataFlow2 are thus labelled as "305", tracking the label of DataFlow2 in FIG. 3A. The zones in LBA space linear view 310 of FIG. 3B are also similarly labeled. Thus, by visually comparing FIGS. 3A and 3B, the die and row positions of the component blocks of each of DataFlows 1 and 2 in FIG. 3A, are respectively preserved in the mapping to zones and erase blocks of FIG. 3B.

It is noted that because the zones in FIG. 3B all belong to one single EG, they all have the same properties. However, in embodiments, by dividing the LBA space of a drive into two or more EGs, thus isolating the zones of one EG from the zones of other EGs, each EG can define the properties of its respective constituent zones. As described below with reference to FIG. 4D, when an EG is further divided into multiple NVM sets, this isolation property also operates at the set level. Thus, as described below, each set within an EG can also have its own zone properties. In embodiments, by using the vast flexibility afforded by dividing the LBA space of an SSD into several EGs, each with one or more sets, various zones with differing properties may be defined in various user defined hierarchies. This allows a host to have significant control over what data is stored, read and erased, in which zone, and at what time. FIGS. 4A through 4D, next described, illustrate the flexibility that this isolation feature provides, in accordance with various embodiments of the present disclosure.

Figure 4A:
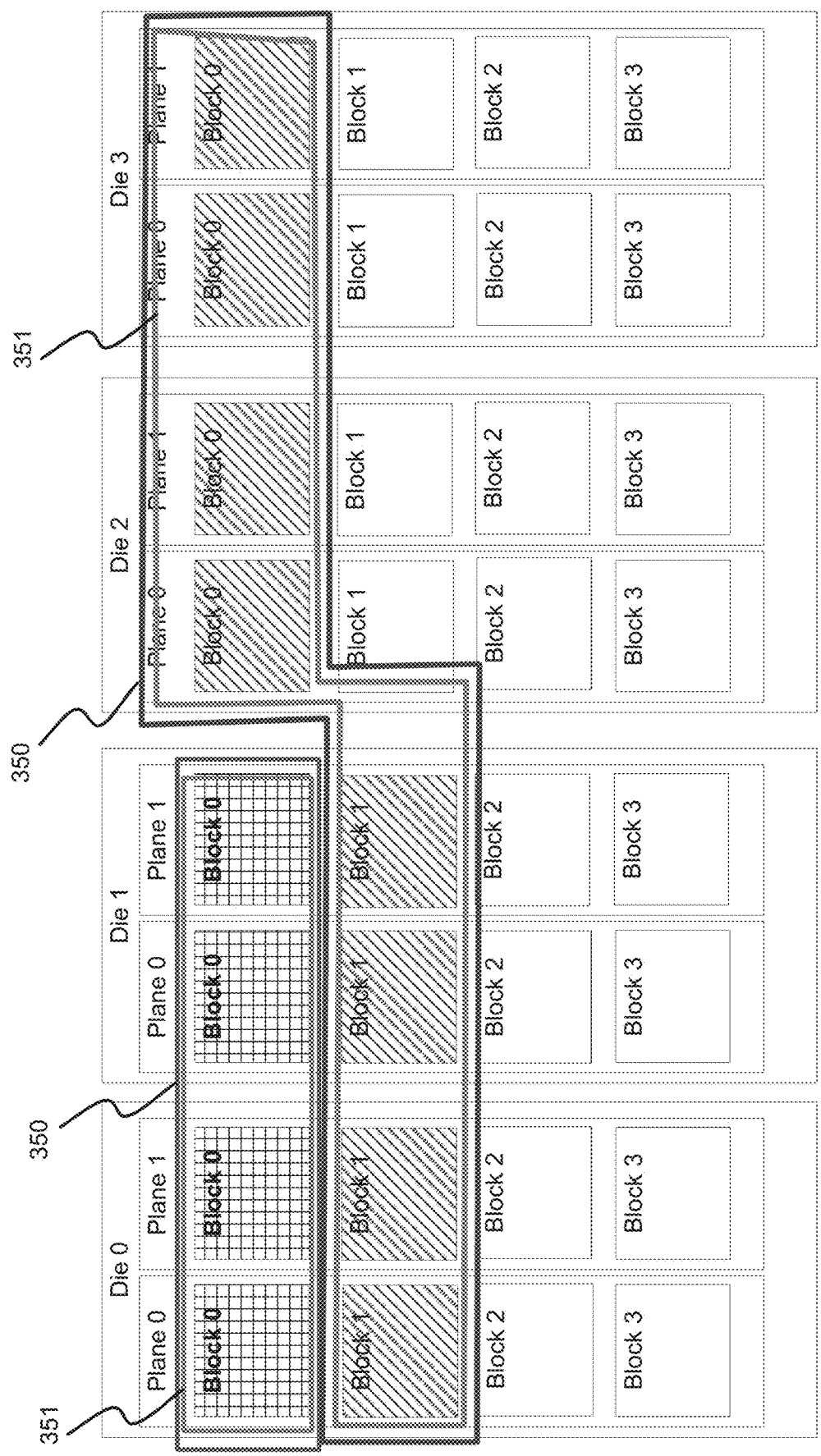
FIG. 4A illustrates the example use case of FIG. 3A, but now with the portions of the dies allocated to each data flow drawn to be isolated from each other.

FIG. 4A illustrates the same example data flow use case of FIG. 3A, but now with the portions of the dies allocated to each data flow drawn to be isolated from each other. In one or more embodiments, an interface such as that shown in FIG. 4A may be provided that allows a user to draw the depicted boundary lines. Thus, through such a user interface a user may draw inner boundaries 351 and outer boundaries 350, around multiple blocks from various dies, as shown in FIG. 4A, and these boundaries are then, in embodiments, mapped to set boundaries and EG boundaries around constituent zones, as shown in the physical view of FIG. 4B. In the specific example of FIG. 4A, the data flows use case of FIG. 3A is now organized by isolating each of DataFlow1 301 and DataFlow2 305, and this isolation is mapped to two separate EGs, as next described with reference to FIG. 4B. It is noted that because the inner boundaries and the outer boundaries of each data flow in FIG. 4A include the exact same blocks, the inner boundary is, in this example, superfluous. This type of boundary situation maps to a single NVM set within an EG. If the inner and outer boundaries were not identical, and the user had drawn in multiple inner boundaries 351 within each outer boundary 350, this would, in embodiments, at the SSD level, map to multiple sets within each EG. Such an example is illustrated in FIGS. 4C and 4D, described below.

Figure 4B:
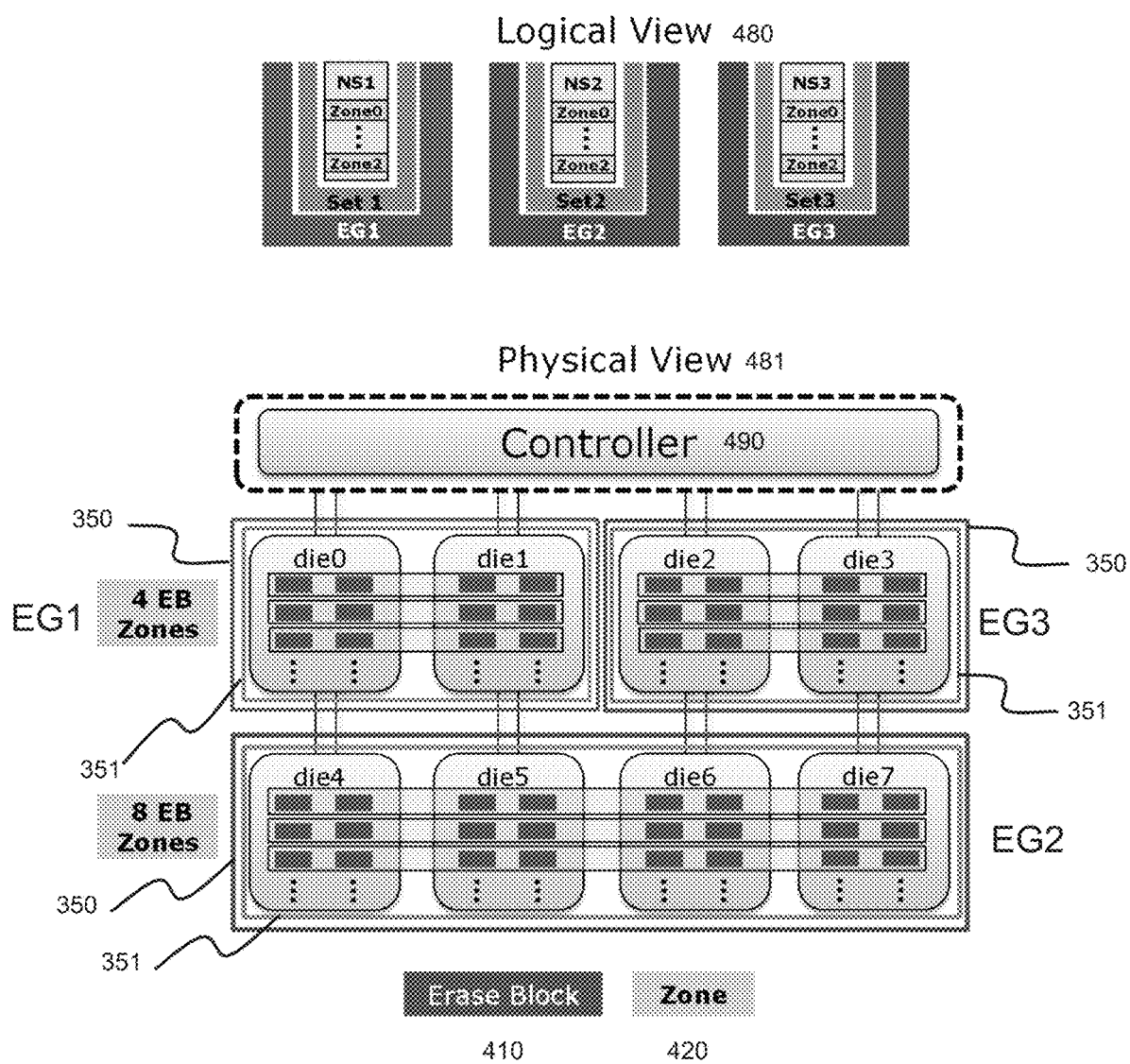
FIG. 4B illustrates mapping of the isolation use case of FIG. 4A to three EGs on the SSD, each EG including multiple zones, the zones having different sizes across the various EGs, in accordance with various embodiments.
Figure 4C:
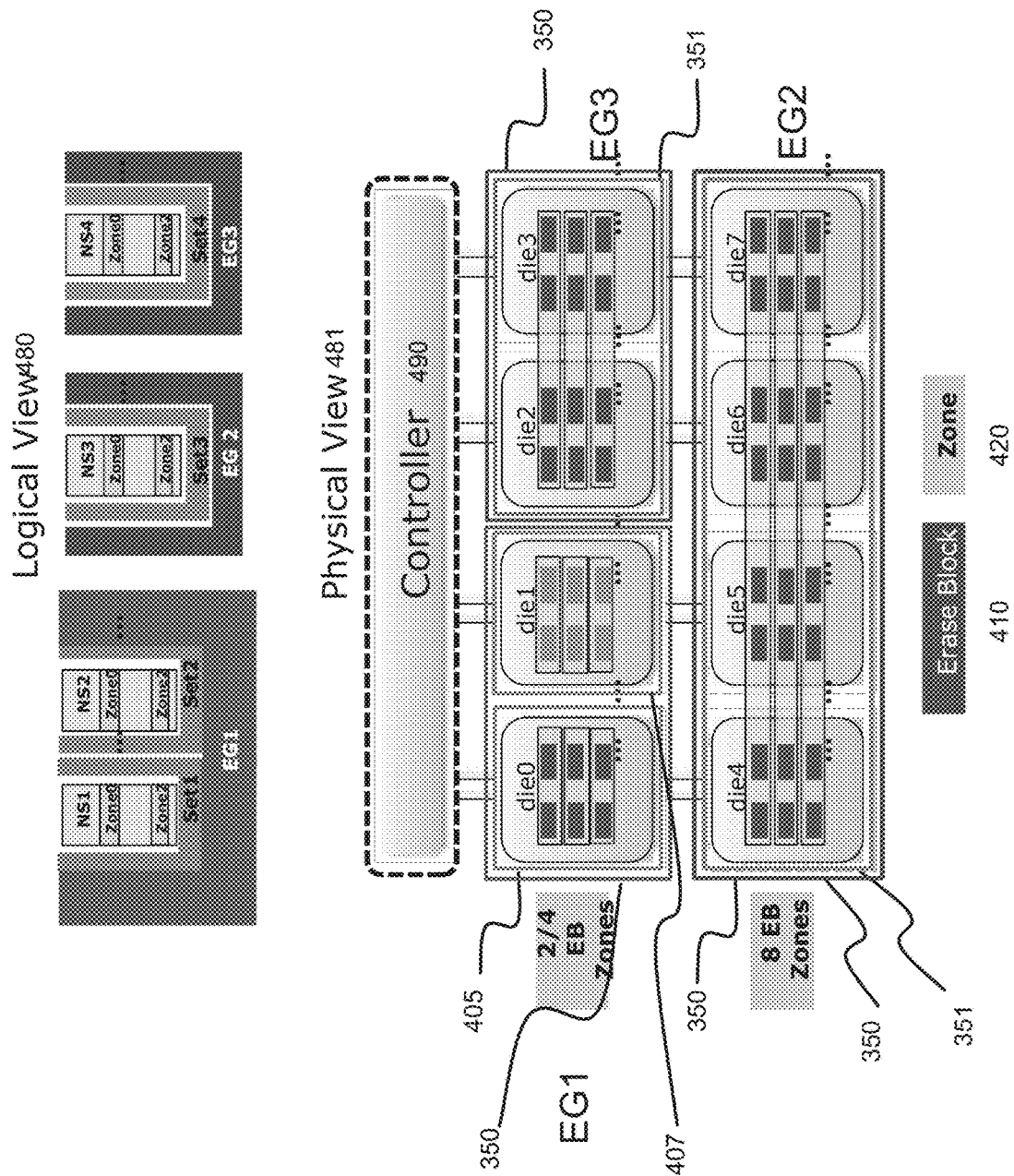
FIG. 4C illustrates a variation of the mapping shown in FIG. 4B, where the first EG has been further divided into two sets, and thus the number of erase blocks per zone has been halved, in accordance with various embodiments.
Figure 4D:
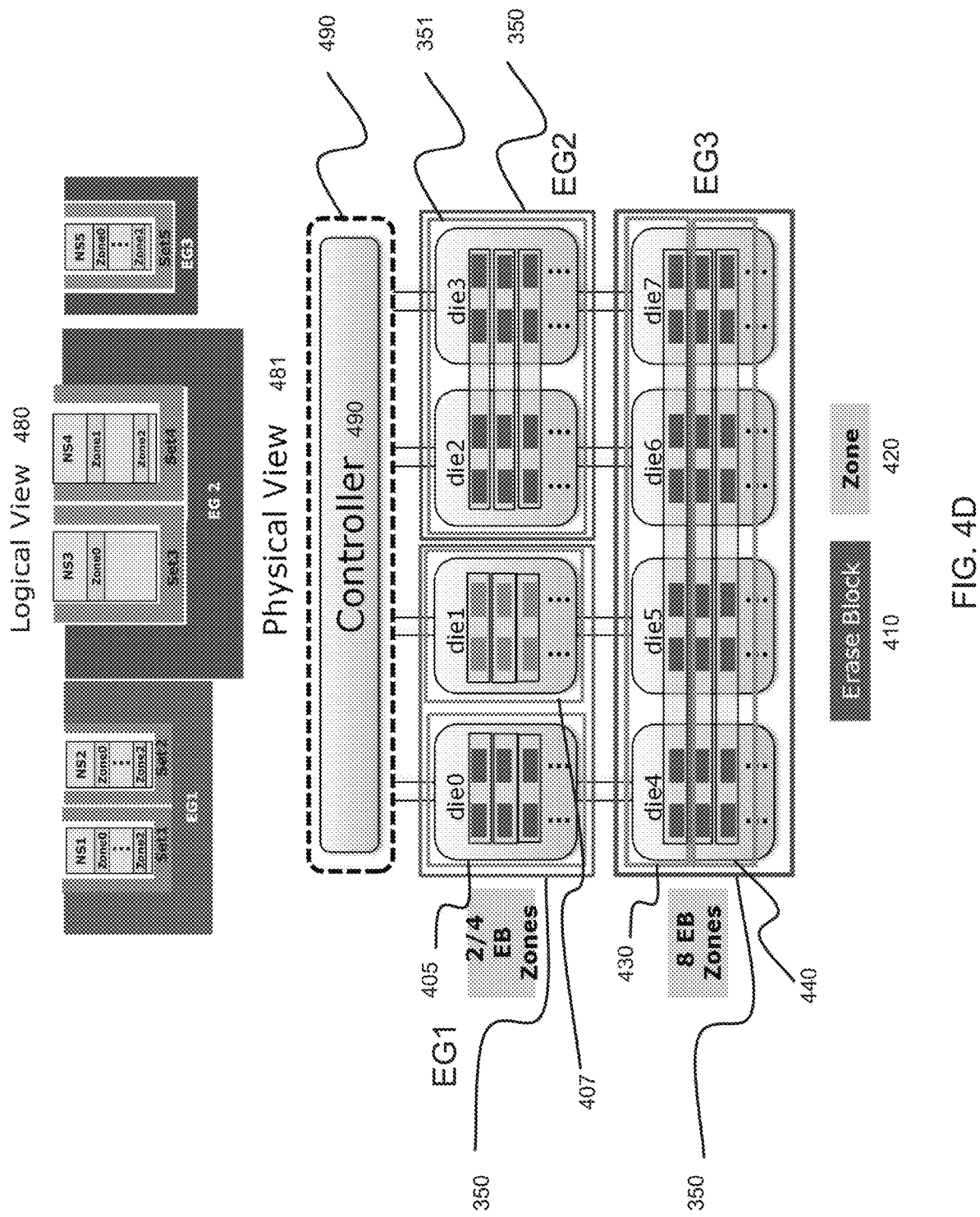
FIG. 4D illustrates a further variation of FIG. 4C, where the second EG has now also been divided into two sets, with the nuance that the sets each include only portions of a die, and no complete die, in accordance with various embodiments.

FIG. 4B thus illustrates mapping of the isolation version of the use case of FIG. 4A to two EGs on the SSD, each EG including multiple zones, the zones having different sizes across the various EGs, in accordance with various embodiments. Moreover, in FIG. 4B, eight dies are used in the mapping, as opposed to the four dies in the examples of FIG. 4A. This allows for different zone sizes between EG1 and EG3. With reference to FIG. 4B, there are shown three EGs, namely EG1, EG2 and EG3. Each EG has an inner boundary 351, as well as an outer boundary 350, and, as in the case of FIG. 4A, in each case in the EGs of FIG. 4B, the inner and outer boundaries are identical, so each EG includes only one set. In this example, DataFlow1 is mapped to EG1, in particular to the first row of each of die0 and die1. Data-Flow2 is mapped to EG2, which, now having an eight blocks per zone, can accommodate DataFlow2 in only one zone, comprising the top row of each of dies die4, die5, die6 and die7. Because there are two dies remaining, a third EG, EG3 was constructed from die2 and die3, as shown.

Continuing with reference to FIG. 4B, in each EG three zones are shown. This is shown both in the logical view 480 as well as in the physical view 481. With reference to physical view 481, EG1 has a single set, Set 1, defined by inner boundary 351. EG1 includes two dies, die0 and die1, within it. Each of the three zones 420 of EG1 spans across both of EG1's constituent dies, and thus includes four erase blocks 410. This is in contrast to the number of erase blocks per zone for EG2, next described, and is a function of the isolation of these two EGs from each other, in accordance with various embodiments.

Continuing with reference to FIG. 4B, again with reference to physical view 481, EG2 includes a single set, Set 2, defined by inner boundary 351 of EG2. EG2 includes four dies, die4, die5, die6 and die7. EG2 has three zones. Each of the three zones of EG1 spans across all four of EG2's constituent dies, and thus includes eight erase blocks 410 per zone 420. This is in contrast to the number of erase blocks 410 per zone 420 for each of EG1, described above, and of EG3. EG3 has the same properties as EG1, but includes dies die2 and die3, and a single set, Set 3. As noted, EG3 does not have any data flow mapped to it.

Finally, with reference to FIG. 4B, logical view 480 tracks the features of the three EGs just described. EG1 is shown with one NVM set, Set1. Interior to Set 1 is shown one namespace labelled as "NS1", and that namespace has three zones, Zone0 through Zone2. Similarly, EG2 is shown with one NVM set, Set2. Sets contain namespaces (NSs), and within Set1 is NS1, containing three zones, Zone0 through Zone2. Finally, EG3 is also shown with one set, Set3, which contains NS3, which in turn includes three zones, Zone0 through Zone2. Logical view 480 does not indicate the differences in blocks per zone, and, as a result, there is symmetry between all three EGs in logical view 480. As noted above, in embodiments, EGs can contain 1 or more NVM sets. Moreover, NVM sets can contain one or more NSs, although in the examples of FIGS. 3B, 4B, 4C and 4D, there is only one NS per set. NSs themselves may be either of the conventional variety where the host uses LBAs of, for example, 512 B size to access anywhere in the drive. Or, for example, namespaces may be of the zoned variety, described above. In embodiments, the zoned variety of NS may be read in similar fashion to the conventional, subject to restrictions on the writes as described above in connection with FIG. 2A.

In embodiments, using EGs, as illustrated in FIGS. 4A and 4B, the logical layer may be tied together to the physical layer all of the way through a software programming stack.

Thus, as a result of the isolation property of EGs in accordance with various embodiments, EG1 and EG2 are seen as differing in the number of erase blocks 410 that respectively comprise each of their constituent zones 420. However, many other variations in EG properties are possible between EGs, within a single EG, and also between constituent sets of that EG, in accordance with various embodiments. One such variation is highlighted in each of FIGS. 4C and 4D. These are next described.

FIG. 4C illustrates a variation of the zone mapping shown in FIG. 4B. In the mapping of FIG. 4C, the first EG, EG1, which includes die0 and die1, has been further divided into two sets, with one die per set, and thus the number of erase blocks 410 per zone 420 has been halved for all zones in EG1, from four blocks per zone to now only two blocks per zone, in accordance with various embodiments. Thus, while the inner 350 and outer 351 boundaries of EG2 and EG3 have not changed, and while outer boundary 350 of EG1 has not changed, the inner boundaries of EG1 have changed. Now there are two sets in EG1, a first set, Set1, defined by inner boundary 405 to include die0, and a second set, Set2, defined by inner boundary 407 to include die1. This change is now reflected in logical view 480. Now there are still three EGs for this SSD, but there are four sets in total. EG1 now has two sets, namely Set1 and Set2, EG2 has Set3 and EG3 now has Set4.

Moreover, because the set boundaries of EG1 have now separated die0 from die1, no zone in either set can include any erase blocks from a die of the other set. Thus, as a result of the new boundaries having been drawn, in the example of FIG. 4C, each zone in each set of EG1 has only two erase blocks. While a zone may cross a die boundary, or may even create a boundary on a die, in embodiments, a zone cannot cross a set boundary. This is due to the fact that a set has specific properties and attributes, and a zone, which is a subdivision of a set, must share those properties and attributes. Thus, the number of erase blocks per zone is now different for each of the three EGs of FIG. 4C. In EG1, there are two blocks 410 per each of the three zones 420. In EG3, there are four blocks 410 per each of the three zones 420. Dies 0 through 3 each have either two or four blocks per zone, and this is shown in the box at the left side of f these dies in FIG. 4C, which says "2/4 EB Zones", meaning that these EGs, EG1 and EG2, have either 2 or 4 erase blocks in their respective zones.

It is noted that it is often useful to not run zones across die boundaries where one or more of the zones is part of a mirror or a parity protection scheme. This is because while a failure of a single die may occur, it is much less likely that multiple dies in a NVM device will fail simultaneously. Thus, for example, if data stored in zones of EG1 is mirrored over die0 and die1, the data is better protected than if the elements of the mirror involve zones on the same die.

Continuing with reference to FIG. 4C, EG2, which is unchanged from the example of FIG. 4B, has the same inner and outer boundaries, and thus also still has three zones of eight erase blocks each. This is shown in the box at the left side of dies 4 through 7 in FIG. 4C, which says "8 EB Zones", meaning that this EG3 has 8 erase blocks in each of its respective zones. It is noted, however, with reference to FIG. 4C, that each EG in the figure has the same number of zones, although they may vary in the number of blocks per zone. In other embodiments according to the present disclosure, each EG, as well as each set within an EG, may set its own properties, which include its number of zones. An example of this is next described, with reference to FIG. 4D.

FIG. 4D illustrates a further variation of FIG. 4C, where EG3 has now also been divided into two sets, with the additional nuance that the new set boundaries of EG3 each include only portions of a die, and no set of EG3 any longer includes a complete die, in accordance with various embodiments.

With reference to FIG. 4D, the inner 350 and outer 351 boundaries of EG3, and the inner 405, 407, as well as outer 350, boundaries of EG1, have not changed relative to the example illustrated in FIG. 4C. While the outer boundary 350 of EG2 has not changed, the inner boundaries of EG2 have changed. Now there are two sets in EG2, a first set, Set 3, defined by inner boundary 430 to include a top row of each of die4 through die7, and a second set, Set 4, defined by inner boundary 440 to include a lower set of rows of each of die4 through die7. This change is now reflected in logical view 480 of FIG. 4D. Now there are still three EGs for this SSD, but there are five sets, and five corresponding NSs, in total. EG1 has Set1 comprising NS1, and Set 2 comprising NS2, EG2 has Set3 comprising NS3 and Set4 comprising NS4, and EG3 now has Set 5 comprising NS5.

Moreover, the number of zones per set has changed, and is now dissimilar between the two sets populating EG2. NS3 of Set3 now has a single zone, zone0, comprising eight erase blocks, including two per die, being the top row of each dies 4-7. Set4, on the other hand, has multiple zones within its sole NS, NS4, which encompasses two lower rows of each of dies 3-7, as shown in FIG. 4D.

Thus, continuing with reference to FIG. 4D, the boundaries of the two sets of EG2, namely Set 3 and Set 4, run across the interior of dies, which illustrates an important feature in accordance with various embodiments. If erase blocks on a single die are part of two different sets, or are part of two different EGs (as EG boundaries may also run through dies), they may have, and likely will have, different properties. In the example of FIG. 4D, for example, Set3, including a single zone, may be designated to store SLC data, and Set4 may be designated as storing only multiple level data, such as, for example, MLC, TLC or QLC data. In one or more embodiments, such an exemplary distinction in properties between sets of a single EG sports the specialized programming of QLC blocks, as described below.

It is noted that while the two new sets of EG2 in FIG. 4D preserved the number of blocks per zone, both having eight blocks per zone, this is not necessary, and, in embodiments, the new set boundaries could have been drawn to change this. As an example, Set3 could have been drawn to exclude any of die7. In such an exemplary case, this hypothetical Set3, called for the purpose of this discussion "Set3A," would then have six erase blocks per zone, while Set4 remained with eight erase blocks per zone. The top row of die7 may then be put in its own additional set, or, in alternate embodiments, simply left out of any set (and thus offline). If the latter option is desired, it is noted, then that top row of die7 would also need to be excluded from EG2, by redrawing the outer boundary of EG2.

In embodiments, although not shown in the examples of FIGS. 4B through 4D, vertical boundaries of EGs and sets may also be drawn, such as, for example, along channels. It is further noted with reference to FIGS. 4A through 4D that, in embodiments, a host computer may send commands to the controller to reconfigure sets within EGs on the fly. Thus, for example, the changes between FIG. 4B and FIG. 4C, or between FIG. 4C and FIG. 4D, may be implemented sequentially by controller 490 at any time in response to ongoing commands received from a host computer. It is understood that the changes to set boundaries are only made after active interaction with the SSD for all areas affected by the change has been stopped. E.g., those EGs being taken offline. It is noted in this regard that it is possible to take one or more EGs offline without affecting other EGs of the SSD. Thus, in embodiments, one may treat EGs as separate and independent virtual SSDs. Moreover, EG boundaries may also be changed on the fly, so for example, a single EG may be split into many EGs, or many EGs may be merged into one.

In embodiments, changing set boundaries within an EG allows a host computer to adapt the use of the SSD to whatever processing is happening at that time. For example, as noted above, a host computer may run an artificial intelligence (AI) based program that gathers large amounts of data, stores the data, and then trains a processing network, e.g., an artificial neural network (ANN) on that data. In such applications, there are intervals of time where many calculations are made in rapid succession, as, for example, when the gathered data is processed. During such times one configuration of sets within an EG, and one set of attributes for each set, may be useful, such as, for example, where less redundancy of blocks within a zone is needed, as all intermediate calculation results are temporary. During such times all blocks within a zone may be designated to store the results, and no block used as redundancy or for parity, and thus the attributes for the set in which those zones are contained have one definition. Then, at other times, the same set may store the final results of the calculations, and more parity blocks are desired, and thus more redundancy to protect the final result data. It is useful to a host to redraw set boundaries, and reconfigure set attributes, to match the needs at each time interval.

As noted above with reference to FIG. 4A, in embodiments, a host computer may, for example, provide a visual interface by which users may draw and redraw the boundaries of EGs and sets within them. In such an interface a user may be presented with a schematic showing the dies of an SSD, equivalent to the physical view 481 as shown in each of FIGS. 4B through 4D, and the user input may be indicated within the interface by drawing EG and set boundary lines around dies or even through dies, as shown in each of FIGS. 4B through 4D, discussed above. The user input may then, for example, be translated to commands that are sent, via a host interface of the controller, to the controller for implementation, as shown.

Thus, in embodiments, using zones within separate EGs, or zones within separate sets of EGs, various mixed uses of the same storage media are facilitated. These include, for example, having different numbers of bits per cell in each set or EG, such as, for example, MLC, TLC, SLC and QLC. Or, for example, using different media in different EGs, such as, for example, FastNAND in one EG, and storage class memory (SCM), etc., in another EG. Or, for example, as described above, zones of different sizes on the same media, such as, for example, 8 die stripes, 4 die stripes, or 2 die stripes. Or, for example, having different groupings of NAND characterized by media properties, such as, for example, current age, predicted aging, reliability, edge EBs, or the like.

Additionally, as noted above, EGs may, in one or more embodiments, be shaped, e.g., their boundaries drawn (as illustrated above, for example), so as to avoid conflicts. This may be done, for example, by setting up one or more EGs in a channel, die or plane, and storing a particular type of data, or sending only a specific type of command or operation, to an EG. For example, a social media enterprise may have internal knowledge as to the frequency of read operations at a given data center versus program or erase operations. Based on that knowledge, the social media company may want to prioritize read operations, and insure a certain latency specification for them. E.g., if a user of the social media platform wants to access certain data, such as a post, stored file, photograph or the like, there is a maximum latency for such access. It may further desire to tweak its algorithms to store data that is regularly read, but not written to, in one or more specialized EGs, where only read operations are performed, thus guaranteeing the desired maximum latency.

Thus, boundaries of each of EGs and Sets may be drawn, in embodiments, to separate NAND dies, NAND die planes, erase blocks, a set of one or more erase blocks, or a portion of one or more erase blocks. In addition, it is noted that other logical separations may also be used, as may exist, or may be known in the future. Thus, for example, NVMe Standards has recently added "Media Units" (MUs) as an additional layering tier of EG→NVM Sets→MU. Thus, a given NVM Set may have multiple MUs, in an analogous manner that a NVM EG may have multiple Sets.

In embodiments, a user may thus draw MU boundaries within each Set of each EG, and set properties and attributes for each MU. Each MU then includes one or more zones, with user defined zone properties, and user defined zone boundaries. For example, different EGs, Sets, and MUs may have different properties from one another, such as endurance capabilities, which may, for example, be determined at the beginning of life of the SSD, or, for example, the different EGs, Sets, and MUs may reflect expected differences in useful life, based on which type of data is planned to be stored in each EG, Set, or MU. For example, as noted above, a given EG, Set, or MU may be designated for storage of SLC data, and another for MLC data. It is further noted, however, that in the NVMe standard, the use of Sets, EGs and MUs is optional, and all, or none, of these logical groupings may be used, in one or more embodiments.

It is noted that the recent NVMe standards development enabling the MU descriptor also allows for the possibility of zones to be constructed from one or more MUs. Thus, if a storage device defined an MU to be equal to one erase block, then a zone may be composed of 4 MUs to make a 4 EB sized zone. Conversely, if an MU is a pair of EBs on a die, then a similarly sized zone may be created out of 2 MUs. The MU structure enables a more dynamic and host controlled creation of zones overlaying different physical layouts. In some examples, EGs and NVM Sets may be dynamically configured as well.

As an example of different zones used to store different types of data, it is noted that QLC SSDs sometimes construct their data flow to enable a program to a faster SLC caching region. It is generally first written by layers to SLC cells, and then, once protected, written again to QLC cells. This operation is sometimes referred to as folding. The data for each layer may be stored in the SLC cells for a pre-defined time, for example, or until the SSD controller is satisfied that the QLC data is stable and error free in the QLC cells. In addition to the above described write cache usage of the SLC region, there may be a usage of a read cache operation of this SLC region. This would be where the drive promotes data from the slower responding QLC region to a faster responding SLC region that is also more robust to read disturb interferences for an oft read section of data.

Moreover, even the process of writing to QLC cells from the SLC cells may have two or more stages. A first "foggy program" in which the data is pushed to the QLC cells, but with known coarseness, then followed by a "fine program" operation. Because of the way a fine program operation of a given word line (WL) can interact with adjacent WLs in a QLC memory block, programming of WLs is iterated between foggy and fine programming operations.

In embodiments according to the present disclosure, different zones of a SSD may be utilized in programming QLC data. In a first option, instead of an SLC cache, each layer of QLC data may be written to a separate SLC zone. Once done, the data is now protected, and may be written to QLC blocks, the SLC data in the specified zones operating as a backup until the data is successfully stored in the QLC cells. In this example, Set 3 of EG2 of FIG. 4D, described above, could be designated as a SLC zone, for this purpose.

Alternatively, in a second option, a portion of several dies may be left as part of conventional namespace, and, because it is not subject to any zone attributes, it can be used as a mixed data SLC/TLC cache, and then written out to QLC blocks which may be set up as a zone or zones within an EG, a set, or an MU.

Moreover, by using zones within EGs according to embodiments of the present disclosure, a host can now control which zones are SLC, which are QLC, and can further control the programming of QLC cells, zone by zone. This gives greater control to a host, and a customer's ability to fine tune its algorithms to control SSD programming, to an extent not hitherto available to hosts.

As noted above, write amplification is an undesirable phenomenon associated with flash memory, SSDs, and additionally host level File Systems and Database applications. It requires that the actual amount of information physically written to the storage media is a multiple of the logical amount intended to be written. Because flash memory must be erased before it can be rewritten, with much coarser granularity of the erase operation when compared to the write operation, the process to perform these operations results in moving (or rewriting) user data and metadata more than once. Due to the way flash memory works, much larger portions of flash must be erased and rewritten than are actually required by the amount of new data. This multiplying effect increases the number of writes required over the life of the SSD, which shortens the time it can operate reliably. The increased writes also consume bandwidth. In embodiments, write amplification may be ameliorated using ZNS.

Generally, a host interface utilizes a structured file system to manage data on a SSD. Using that file system, such as, for example, a log structured file system, the host performs "garbage collection", which involves write amplification. Write amplification is also performed on the SSD, as noted above. In one or more embodiments, a portion of data represented in a file system running on a host interface to a SSD may be considered as a zone. As a result, in embodiments, a file system write amplification operation of a host, and a SSD's write amplification are coordinated together, and the operation need only be performed once.

In one or more embodiments, an EG, or a Set, may also include a conventional namespace (not a zoned namespace) to improve isolation from activity occurring in the zones of the EG or Set. For example, this technique may be used to isolate a failure of one EG on a drive from other EGs on the same drive. Thus, in such embodiments, they disperse their zone activity without concern for separation per drive, versus separation per EG. The separation per EG thus enables more potential isolated resources to disperse their bandwidth concerns.

Figure 5:
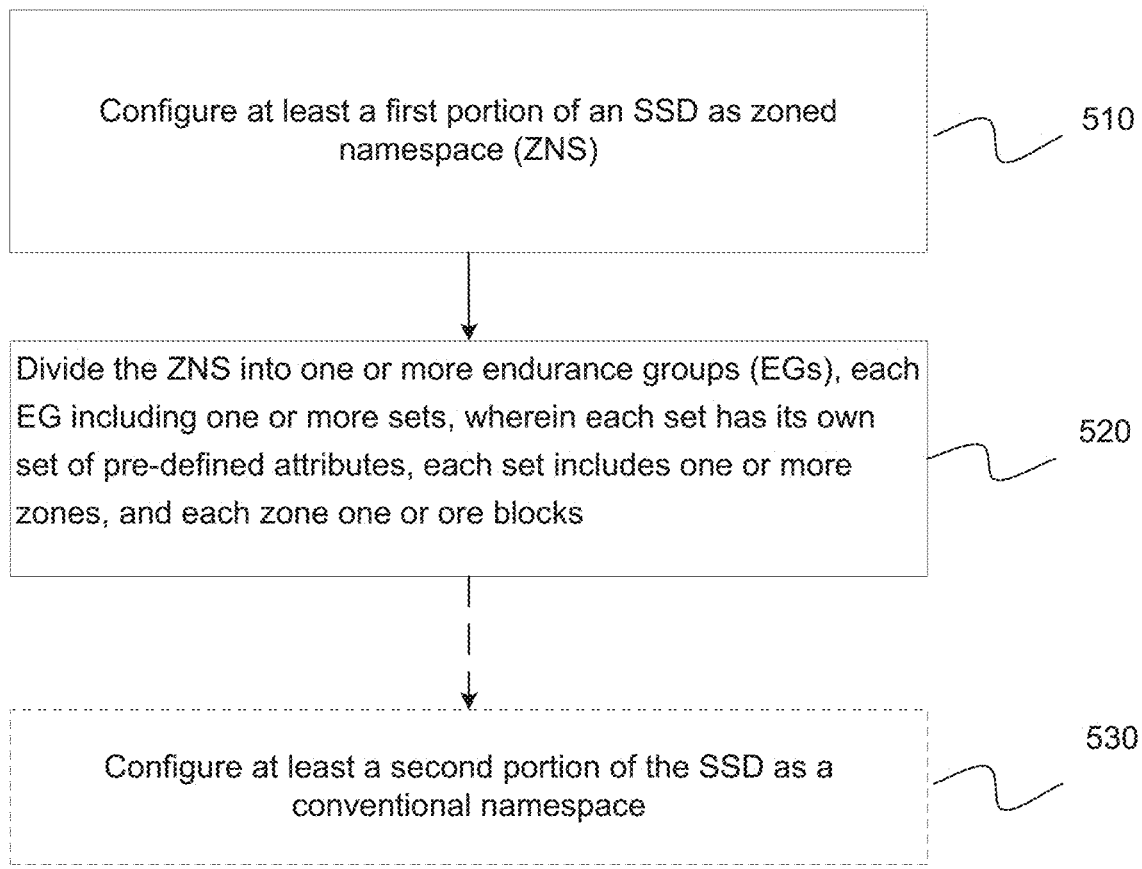
FIG. 5 is a flow diagram of a method for configuring a portion of an SSD as a ZNS, according to some examples.

FIG. 5 depicts an embodiment of a method 500 of configuring a portion of the memory space of an SSD as a ZNS, according to some embodiments. In embodiments, method 500 is performed by an exemplary SSD, such as, for example, SSD 601 of FIG. 6, in response to user commands entered via a user configuration interface displayed to a user by a host, and sent to the SSD, after processing on the host. In embodiments, the user configuration interface may display to a user a view such as is shown in FIG. 3A, described above.

Beginning with block 510, at least a first portion of an SSD is configured as a ZNS. For example, a user may indicate via a user configuration interface of a host computer to make this configuration, and which LBAs are to be included in the ZNS. As noted above, this allows for the division of the ZNS into various zones.

From block 510 method 500 proceeds to block 520, where the ZNS is divided into one or more EGs, each EG including one or more sets, wherein each set has its own set of pre-defined attributes, each set includes one or more zones, and each zone includes one or more blocks. For example, as shown in FIG. 4A, using the displayed user configuration interface, the user may draw lines or boundaries around various icons representing blocks within planes, within dies of the SSD. The designated blocks may be, for example, all in one die, or may include rows of blocks across various dies, as shown in FIG. 4A.

From block 520 method 500 may optionally proceed to optional block 530 (shown in a dashed boundary), where the user may also configure at least a second portion of the memory space of the SSD as a conventional namespace.

FIG. 6, next described, illustrates an example memory device controller provided in an example SSD, in accordance with various embodiments. With reference to FIG. 6, there is shown SSD 601. In embodiments, SSD 601 may include nonvolatile NAND storage 630. SSD 601 includes device controller 610 and NAND storage 630. NAND storage 630 may be, for example, organized as a set of dies, each die organized as illustrated in FIG. 1A above. Moreover, the set of dies may include 32 dies overall, with one die used for XOR protection, as illustrated in FIG. 1B, described above.

Continuing with reference to FIG. 6, device controller 610 is connected to a host over link 605, which, for purposes of illustration, is a simplified link that may include multiple channels to exchange data and commands between the host (not shown) and device controller 610. In embodiments, link 605 may be a PCIe link, or may comprise other links as may be known. Device controller 610 also includes ZNS manager 615, which implements user commands entered at the host, for example via a user interface displayed by the host, to configure SSD 601 to have a ZNS. For example, a portion of the LBAs of NAND storage 630 may be designated as a ZNS. Once that is done, the ZNS may be divided into one or more EGs, each EG including one or more sets, wherein each set has its own set of pre-defined attributes, each set includes one or more zones, and each zone one or more blocks, as described above with reference to method 500 of FIG. 5. Finally, as shown, device controller 610 is connected to NAND storage 630 over communications link 625.

Thus, in embodiments, EGs and Sets may be combined with ZNS to offer greater control of how, where and under what configurations, data is stored to various user-defined sections on a SSD. In embodiments, this exposure of control functionalities to a SSD host allows the host to granularly control write, program and erase operations to occur at specified zones, and to change those specifications as may be desired. This expanded functionality provides improved performance to data center and other hyperscale users and their clients. In embodiments, larger SSDs may be partitioned into groups of zones for better usage by host devices. In embodiments, the groups may comprise, for example, EGs, the EGs comprising one or more sets, each set containing a defined set of zones with its own set of properties for the set, or if there is only one set, the EG. In one or more embodiments, hosts may use different EGs, or sets within them, to access the device and thereby manage die or channel conflicts in the SSD.

In embodiments, a method of configuring a solid state device (SSD) includes configuring at least a portion of the SSD as zoned namespace, dividing the zoned namespace into one or more EGs, each EG including one or more sets, wherein each set has its own set of pre-defined attributes, and wherein each set of each EG includes one or more zones, and each zone includes one or more blocks.

In embodiments, the method further includes configuring another portion of the SSD as a conventional namespace.

In some embodiments, each set of each EG includes two or more zones. In some embodiments, the zoned namespace is divided into three EGs, each EG including at least one set. In some such embodiments, each EG has a single set, and a first EG has eight blocks per zone, and second and third EGs each have four blocks per zone.

In some embodiments, each of the one or more zones of a set includes a pre-defined number of blocks per zone. In some embodiments, the data attributes of a set include at least one of: a number of blocks per zone, a number of bits per cell, or a set of allowed memory operations on a cell. In some such embodiments, each zone of a set is configured to either allow only read operations, allow only read and write operations, or allow each of read, write and erase operations.

In some embodiments, a set includes one or more complete dies of the SSD. In some embodiments, an EG or a set boundary runs through one or more dies of the SSD.

In some embodiments, the method further includes changing the pre-defined attributes of one set without changing the pre-defined attributes of any other set of the ZNS. In other embodiments, the method further includes providing to a user a host interface that is configured to present configuration options of the ZNS to the user, receiving configuration commands from the user for the ZNS, and configuring the ZNS in accordance with the user's commands. In some such embodiments, the host interface displays visual representations of dies of the SSD, and receives user input as to EG boundaries and set boundaries. In some such embodiments, the user input includes lines drawn around or across the visual representations of the dies.

In some embodiments, a system includes a NAND memory and a NAND controller, the NAND controller including a host interface, configured to receive configuration commands for the NAND memory from a host computer, and processing circuitry, coupled to the host interface, configured to, in response to at least one command received from the host computer, configure a zoned namespace of the NAND memory to include one or more EGs, each EG having its own set of attributes, wherein each EG includes one or more zones, and each zone includes one or more blocks.

In some embodiments, the processing circuitry is further configured to, in response to the at least one command, configure each EG with one or more sets, each of the one or more sets including one or more zones of the EG. Additionally, in some embodiments, the processing circuitry is further configured to, in response to at least one additional command received from the host computer, change boundaries of one or more sets within an EG, add new sets to an EG, or combine two sets of an EG, without changing the data stored in the zones of the EG.

In some embodiments, a computing apparatus includes means for receiving one or more user commands for configuring at least a portion of an SSD as a ZNS, and means for configuring at least a portion of the of the SSD as a ZNS in response to the command. In such embodiments the means for configuring includes means for dividing the ZNS into one or more EGs, each EG including one or more sets, each set having its own set of pre-defined attributes, and each set of each EG including one or more zones, each zone includes one or more blocks.

In some embodiments of the apparatus, each of the one or more zones of a set includes a pre-defined number of blocks per zone. In some embodiments of the apparatus, the means for configuring further includes means for changing boundaries of one or more sets within an EG in response to one or more additional user commands.

While the foregoing is directed to embodiments of the present disclosure, other and further embodiments of the disclosure may be devised without departing from the basic scope thereof, and the scope thereof is determined by the claims that follow.

What is claimed is:

1. A method of configuring a solid state device (SSD), comprising:
   configuring at least a portion of the SSD as zoned namespace;
   dividing the zoned namespace into one or more endurance groups (EGs), wherein EG boundaries cross die boundaries;
   dividing the one or more EGs into one or more sets, wherein each EG defines properties of constituent sets, wherein set boundaries cross die boundaries;
   dividing the one or more sets of an EG into one or more zones, wherein each set defines properties of constituent zones, wherein each zone includes one or more blocks; and
   receiving input to redraw the EG boundaries and sets within the EGs.

2. The method of claim 1, wherein another portion of the SSD is configured as a conventional namespace.

3. The method of claim 1, wherein each set of each EG includes two or more zones.

4. The method of claim 1, wherein the zoned namespace is divided into three EGs, each EG including at least one set.

5. The method of claim 4, wherein each EG has a single set, and wherein a first EG has eight blocks per zone, and a second and third EGs each have four blocks per zone.

6. The method of claim 1, wherein each of the one or more zones of a set includes a pre-defined number of blocks per zone.

7. The method of claim 1, wherein attributes of a set include at least one of: number of blocks per zone, number of bits per cell, or allowed memory operations on a cell.

8. The method of claim 7, wherein each zone of a set is configured to either: allow only read operations, allow only read and write operations, or allow read, write and erase operations.

9. The method of claim 1, wherein a set includes one or more complete dies of the SSD.

10. The method of claim 1, wherein an EG or a set boundary runs through one or more dies of the SSD.

11. The method of claim 1, further comprising changing pre-defined attributes of a set without changing pre-defined attributes of any other set of the zoned namespace.

12. The method of claim 1, further comprising:
    providing a host interface configured to present configuration options of the zoned namespace to a user;
    receiving configuration commands from the user for the zoned namespace; and
    configuring the zoned namespace in accordance with the commands.

13. The method of claim 12, wherein the host interface displays visual representations of dies of the SSD, and receives user input as to EG boundaries and set boundaries.

14. The method of claim 13, wherein the user input includes lines drawn around or across the visual representations of the dies.

15. A system comprising:
    a NAND memory and a NAND controller;
    the NAND controller comprising:
    a host interface, configured to receive configuration commands for the NAND memory from a host computer; and
    processing circuitry, coupled to the host interface, configured to, in response to at least one command received from the host computer:
    configure a zoned namespace of the NAND memory to include:
    one or more EGs, wherein EG boundaries cross die boundaries, wherein each EG includes one or more zones, wherein each EG defines properties of constituent zones, and each zone includes one or more blocks, wherein the controller is configured to receive input to redraw the EG boundaries and sets within the EGs.

16. The system of claim 15, wherein the processing circuitry is further configured to, in response to the at least one command, configure each EG with one or more sets, each of the one or more sets including one or more zones of the EG.

17. The system of claim 16, wherein the processing circuitry is further configured to, in response to at least one additional command received from the host computer, change boundaries of one or more sets within an EG, add new sets to an EG, or combine two sets of an EG, without changing data stored in the zones of the EG.

18. A computing apparatus, comprising:
    a memory means; and
    a controller coupled to the memory means, wherein the controller is configured to:
    receive one or more user commands for configuring at least a portion of an SSD as a zoned namespace; and
    configure at least a portion of the SSD as a zoned namespace in response to the command, wherein the configuring at least a portion of the of the SSD as a zoned namespace in response to the command includes:
    divide the zoned namespace into one or more endurance groups (EGs), wherein EG boundaries cross die boundaries, dividing the one or more EGs into one or more sets, wherein each EG defines properties of constituent sets, wherein set boundaries cross die boundaries, dividing the one or more sets of each EG into one or more zones, wherein each set defines properties of constituent zones, and wherein each zone includes one or more blocks; and
    receive input to redraw the EG boundaries and sets within the EGs.

19. The apparatus of claim 18, wherein each of the one or more zones of a set includes a pre-defined number of blocks per zone.

20. The apparatus of claim 18, wherein the configuring at least a portion of the SSD as a zoned namespace further includes, changing boundaries of one or more sets within an EG in response to one or more additional user commands.

* * * * *